US011440378B2

(12) United States Patent
Inoue et al.

(10) Patent No.: US 11,440,378 B2
(45) Date of Patent: Sep. 13, 2022

(54) CONNECTION STRUCTURE BETWEEN WINDSHIELD AND COWL LOUVER

(71) Applicants: AGC INC., Tokyo (JP); HONDA MOTOR CO., LTD., Tokyo (JP)

(72) Inventors: Takafumi Inoue, Tokyo (JP); Eiji Oki, Tokyo (JP); Tohru Ono, Wako (JP); Tomoyoshi Yoshizawa, Wako (JP); Shota Anegawa, Wako (JP)

(73) Assignees: AGC INC., Tokyo (JP); HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 17/186,801

(22) Filed: Feb. 26, 2021

(65) Prior Publication Data

US 2021/0178863 A1  Jun. 17, 2021

Related U.S. Application Data

(63) Continuation of application No. PCT/JP2019/033546, filed on Aug. 27, 2019.

(30) Foreign Application Priority Data

Aug. 29, 2018 (JP) .............................. JP2018-160464

(51) Int. Cl.
 *B60J 1/00* (2006.01)
 *B60J 1/02* (2006.01)
 *B62D 25/08* (2006.01)
(52) U.S. Cl.
 CPC .................. *B60J 1/006* (2013.01); *B60J 1/02* (2013.01); *B62D 25/081* (2013.01)
(58) Field of Classification Search
 CPC ............ B60J 1/006; B60J 1/02; B62D 25/081
 (Continued)

(56) References Cited

U.S. PATENT DOCUMENTS 4,930,790 A * 6/1990 Sheridan ............... F02B 61/045
 277/645
6,769,700 B2   8/2004 Ortmuller et al.
 (Continued)

FOREIGN PATENT DOCUMENTS

JP  H05-97061 A   4/1993
JP  H11-300773 A  11/1999
 (Continued)

OTHER PUBLICATIONS

International Searching Authority, "International Search Report," issued in connection with International Patent Application No. PCT/JP2019/033546, dated Oct. 1, 2019.
 (Continued)

*Primary Examiner* — D Glenn Dayoan
*Assistant Examiner* — Sunsurraye Westbrook
(74) *Attorney, Agent, or Firm* — Foley & Lardner LLP (57) ABSTRACT

A windshield and a cowl louver are reliably connected together by effectively absorbing an error in shape or dimension of each of laminated glass, a clip and the cowl louver. A cowl louver includes a body portion, a first protrusion portion, an engageable portion, and a second protrusion portion. A clip in a plate shape includes a first plate portion, a second plate portion, a first bent portion, a third bent portion, a second bent portion and an engaged portion such that the second bent portion and the first protrusion portion are at least partly brought into contact with each other, and the engaged portion and the second protrusion portion are at least partly brought into contact with each other.

15 Claims, 12 Drawing Sheets

(58) Field of Classification Search
  USPC .............................. 296/146.15, 93, 84.1, 201
  See application file for complete search history.

(56) References Cited

U.S. PATENT DOCUMENTS

| | | | |
|---|---|---|---|
| 7,806,455 B2 * | 10/2010 | Polke ....................... | B60J 10/30 |
| | | | 296/93 |
| 8,628,137 B2 | 1/2014 | Platt et al. | |
| 9,259,994 B2 * | 2/2016 | Emer ....................... | B60J 10/34 |
| 9,994,094 B2 * | 6/2018 | Ortmueller .............. | B60J 10/70 |

FOREIGN PATENT DOCUMENTS

| | | |
|---|---|---|
| JP | 2003-532574 A | 11/2003 |
| JP | 2011-520694 A | 7/2011 |
| JP | 2013-032083 A | 2/2013 |
| JP | 2017-226411 A | 12/2017 |
| WO | WO-2015/181960 A1 | 12/2015 |

OTHER PUBLICATIONS

International Searching Authority, "Written Opinion," issued in connection with International Patent Application No. PCT/JP2019/033546, dated Oct. 1, 2019.
International Searching Authority, "International Search Report," issued in connection with International Patent Application No. PCT/JP2018/016273, dated May 29, 2018.
International Searching Authority, "Written Opinion," issued in connection with International Patent Application No. PCT/JP2018/016273, dated May 29, 2018.

* cited by examiner

CONNECTION STRUCTURE BETWEEN WINDSHIELD AND COWL LOUVER

CROSS-REFERENCE TO RELATED APPLICATION

This application is a continuation of PCT Application No. PCT/JP2019/033546, filed on Aug. 27, 2019, which is based upon and claims the benefit of priority from Japanese Patent Application No. 2018-160464 filed on Aug. 29, 2018. The contents of those applications are incorporated herein by reference in their entireties.

TECHNICAL FIELD

The present invention relates to a connection structure between a windshield and a cowl louver.

BACKGROUND ART

Patent Document 1 listed below discloses a connection structure which connects the windshield (laminated glass) of an automobile and a cowl top cover (cowl louver). The connection structure disclosed by Patent Document 1 is configured such that the windshield has a clip member (clip) fixed to a rear surface adjacent a lower edge portion thereof, and the windshield and the cowl top cover are connected by engaging an engageable portion with an engaged portion, the cowl top cover including the engageable portion, and the clip member including the engaged portion.

The clip member disclosed by Patent Document 1 is a resin molded product, which is monolithically injection-molded of a thermoplastic resin, a rubber material and so on so as to be elastically deformable. The clip member thus molded has a step portion disposed adjacent a forward end portion thereof so as to serve as the engaged portion.

PRIOR ART DOCUMENT

Patent Document

Patent Document 1: JP-A-2013-032083

DISCLOSURE OF INVENTION

Technical Problem

Laminate glass has an error in shape or outline dimension, such as a curvature, and a clip or a cowl louver also has an error in shape or outline dimension. Further, when laminated glass, a clip and a cowl louver are assembled together, the assembly position has an error.

The clip disclosed by Patent Document 1, which is mounted to a lower edge portion of the windshield, is a solid product having not only a high resistance to compression but also a constant volume, though being an elastically deformable, synthetic plastic molded product. For this reason, when there is a large error in dimension or assembly position among the laminated glass, the clip and the cowl louver, the error is not absorbed only by deformation in the clip, resulting in that there has been caused a problem in that the engageable portion cannot be engaged with the engaged portion.

Specifically, in order to make the connection reliable, a combination of the clip and the cowl louver has at least two sets, each set having an engaged portion and an engageable portion, as disclosed in Patent Document 1 (refer to FIGS. 14 and 15 of Patent Document 1) as well. In a case where there is a large error in dimension or assembly position of each of the laminated glass, the clip and the cowl louver in a connection structure including the at least two sets of an engaged portion and an engageable portion, even when the clip can be largely deformed to successfully engage the engageable portion with the engaged portion in a first set, for example, the clip cannot be further deformed such that the engageable portion is not engaged with the engaged portion in a second set, resulting in that there has been caused a problem in that the windshield cannot be connected to the cowl louver.

The present invention is provided, taking the above-mentioned circumstances into consideration. It is an object of the present invention to provide a novel connection structure between a windshield and a cowl louver, which is capable of reliably connecting the windshield and the cowl louver by effectively absorbing an error in shape, dimension or assembly position of each of the laminated glass, a clip and the cowl louver.

Solution to Problem

In order to attain the object, the present invention provides a connection structure between a windshield and a cowl louver, which includes laminated glass including a first glass plate disposed on an outer side of a vehicle, a second glass plate disposed on an inner side of the vehicle and an interlayer bonding the first glass and the second glass; a clip disposed on a forward end portion of the laminated glass; and a cowl louver including a body portion, a first protrusion portion disposed on a backward end portion of the body portion, an engageable portion disposed on an inner side surface of the body portion via a joint portion so as to extend toward the backward end portion of the body portion, and a second protrusion portion disposed on a backward end portion of the engageable portion; wherein the clip is a plate including a first plate portion to be bonded to an inner side surface of the second glass plate, a second plate portion to be disposed adjacent the forward end portion of the laminated glass so as to extend along an end surface of the forward end portion of the laminated glass, a first bent portion connecting between the first plate portion and the second plate portion, a third plate portion extending in a forward direction with respect to the forward end portion of the laminated glass, a second bent portion connecting between the second plate portion and the third plate portion, and an engaged portion disposed on a leading end portion of the third plate portion; and wherein the second bent portion and the first protrusion portion are at least partly brought into contact with each other, and the engaged portion and the second protrusion portion are at least partly brought into contact with each other.

Advantageous Effects of Invention

In accordance with the present invention, it is possible to reliably connect a windshield and a cowl louver by effectively absorbing an error in shape, dimension or assembly position of each of the laminated glass, a clip and the cowl louver.

DESCRIPTION OF EMBODIMENTS

Now, embodiments of the connecting structure between a windshield and a cowl louver according to the present invention will be described in reference to the accompanying drawings. In the drawings, identical or similar members or parts are denoted by like reference numerals, and redundant explanation may be omitted about such identical or similar members or parts.

In Description, the terms "upward" and "downward" mean an upward direction and a downward direction of a vehicle body, respectively, and the term "longitudinal direction" means a longitudinal direction of the vehicle body. Because a windshield is normally mounted to a vehicle body in such a state that the windshield has a lower end portion and an upper end portion inclined forward and backward, respectively, the lower end portion and the upper end portion are called a forward end portion and a backward end portion. This is also applied to a cowl louver and a clip.

In Drawings, an arrow U (up) indicates an upward direction of the vehicle body (not shown), an arrow D (down) indicates a downward direction of the vehicle body, an arrow F (forward) indicates a forward direction of the vehicle body, and an arrow B (backward) indicates a backward direction of the vehicle body. With regard to the surfaces of each of the windshield, a clip and the cowl louver, the surface called "outer side surface" indicates a surface of the vehicle body facing outside, and the surface called "inner side surface" indicates a surface of the vehicle body facing inside.

Figure 1:
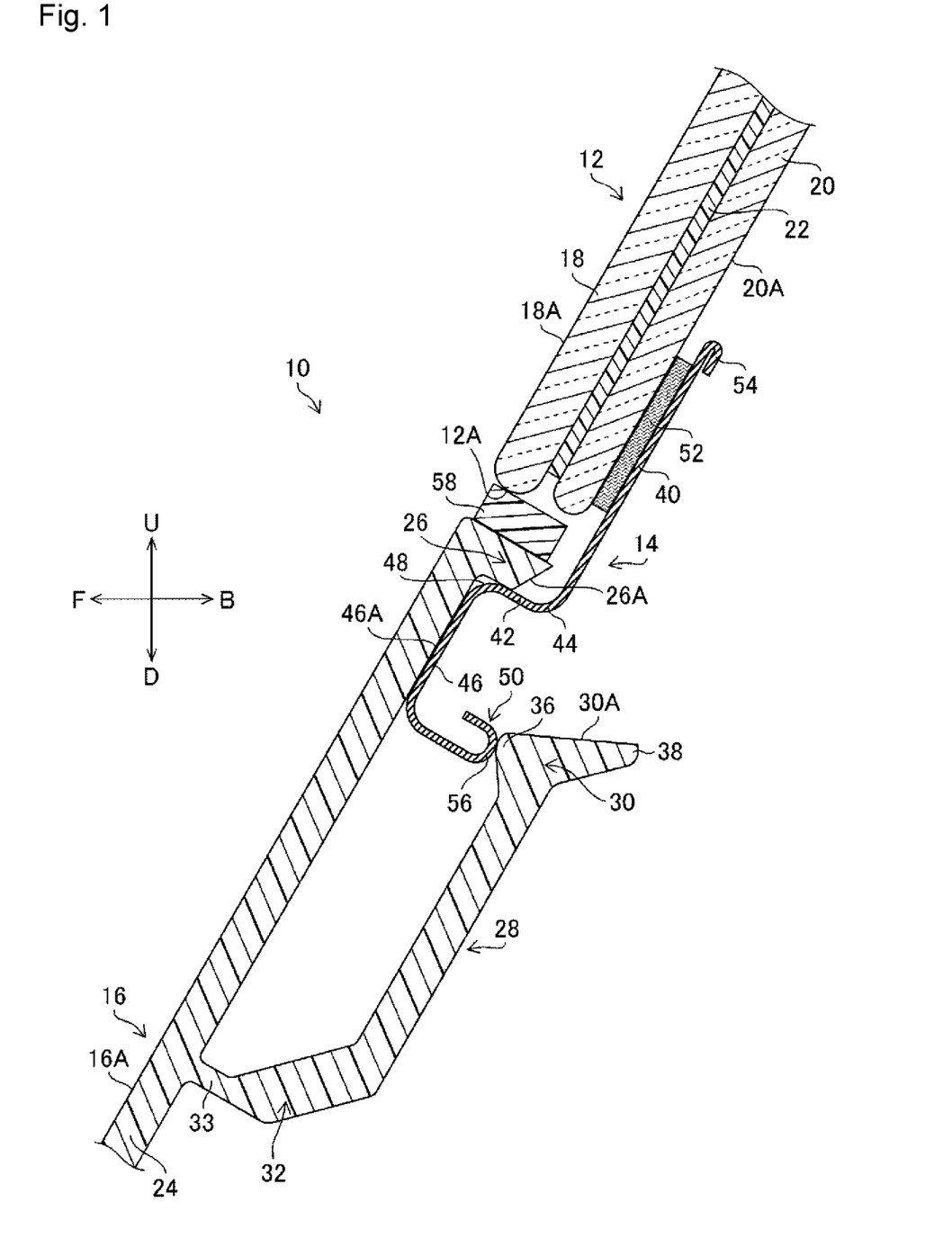
FIG. 1 is an enlarged cross-sectional view illustrating essential portions of the connection structure according to an embodiment of the present invention.

FIG. 1 illustrates a connection structure 10 wherein a windshield 12 has a forward end portion connected to a backward end portion of a cowl louver 16 via a clip 14.

The windshield 12 shown in FIG. 1 is made of laminated glass. The windshield 12 shown in FIG. 1 includes a first plate glass 18 disposed on an outer side of a vehicle body, a second plate glass 20 disposed on an inner side of the vehicle body, and an interlayer 22 bonding the first glass plate 18 and the second glass plate 20. The interlayer may be, for example, an interlayer made of a resin, such as PVB (polyvinyl butyral) or EVA (ethylene-vinyl acetate).

Figure 2:
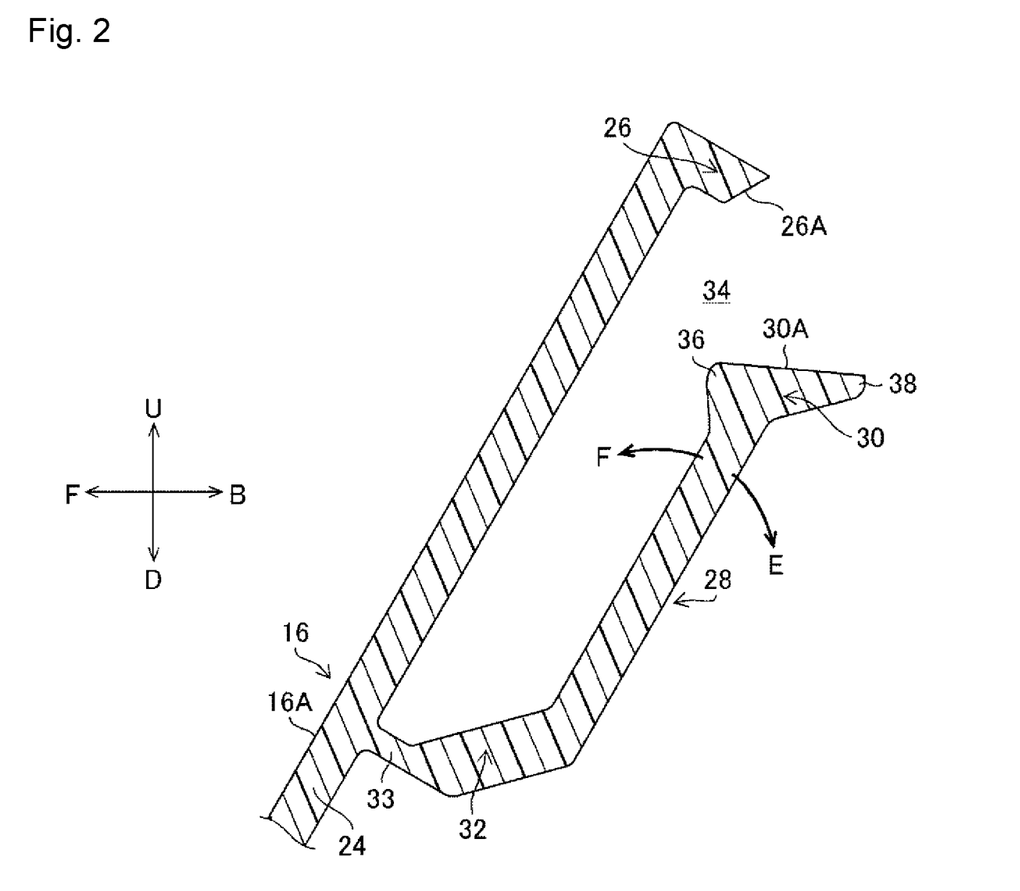
FIG. 2 is an enlarged cross-sectional view illustrating essential portions of a backward end portion of the cowl louver according to the embodiment.

The cowl louver 16 shown in FIG. 2 includes a body portion 24, a first protrusion portion 26, an engageable portion 28, and a second protrusion portion 30. The cowl louver 16 may be a plate which is an injection-molded product made of, for example, polypropylene or ABS (thermoplastic resin including three components of acrylonitrile, butadiene and styrene).

The cowl louver 16 is configured to have an outer side surface 16A disposed so as to be substantially flush with an outer side surface 18A of the first glass plate 18 of the windshield 12 in a state wherein the forward end portion of the windshield 12 is connected to the backward end portion of the cowl louver 16 via the clip 14 as shown in FIG. 1.

The first protrusion portion 26 is disposed on a backward end portion of the body portion 24 so as to protrude toward an inner side of the vehicle body as shown in FIG. 2. The first protrusion portion 26 has an end surface 26A disposed thereon, and the end surface 26A is configured as an inclined surface, which is inclined toward a forward side from a backward side of the vehicle. The end surface 26A serves as a first guide surface as described later.

The engageable portion 28 is formed in a flat plate shape. The engageable portion 28 is bonded to an inner side surface of the body portion 24 via a bonded portion 32 so as to extend toward the backward end portion of the body portion 24. More specifically, the engageable portion 28 branches off the body portion 24 toward the inner side via the bonded portion 32 and is disposed so as to be away from the body portion 24 toward the inner side and extend backward in substantially parallel to the body portion 24. The bonded portion 32 has a constricted portion 33 disposed thereon. The provision of the constricted portion 33 permits the engageable portion 28 to undergo elastic deformation toward the inner side (in a direction indicated by an arrow E in FIG. 2), using the bonded portion 32 as a fulcrum.

The second protrusion portion 30 is disposed on a backward end portion of the engageable portion 28. The second protrusion portion 30 is disposed in a position closer to a forward end than the first protrusion portion 26 disposed on the backward end portion of the body portion 24. This arrangement provides a gap 34 between the body portion 24 and the engageable portion 28 in a longitudinal direction of the vehicle body to relatively engage the clip 14 and the cowl louver 16.

More detailed explanation will be made about the second protrusion portion 30. The second protrusion portion 30 includes a first convex portion 36 protruding toward an outer side of the vehicle, and a second convex portion 38 protruding toward the inner side of the vehicle. The second protrusion portion 30, which connects between the first convex portion 36 and the second convex portion 38, has an end surface 30A disposed thereon so as to provide an inclined surface, which is inclined toward the forward side from a backward side of the vehicle. The end surface 30A serves as a second guide surface as described later.

Figure 3:
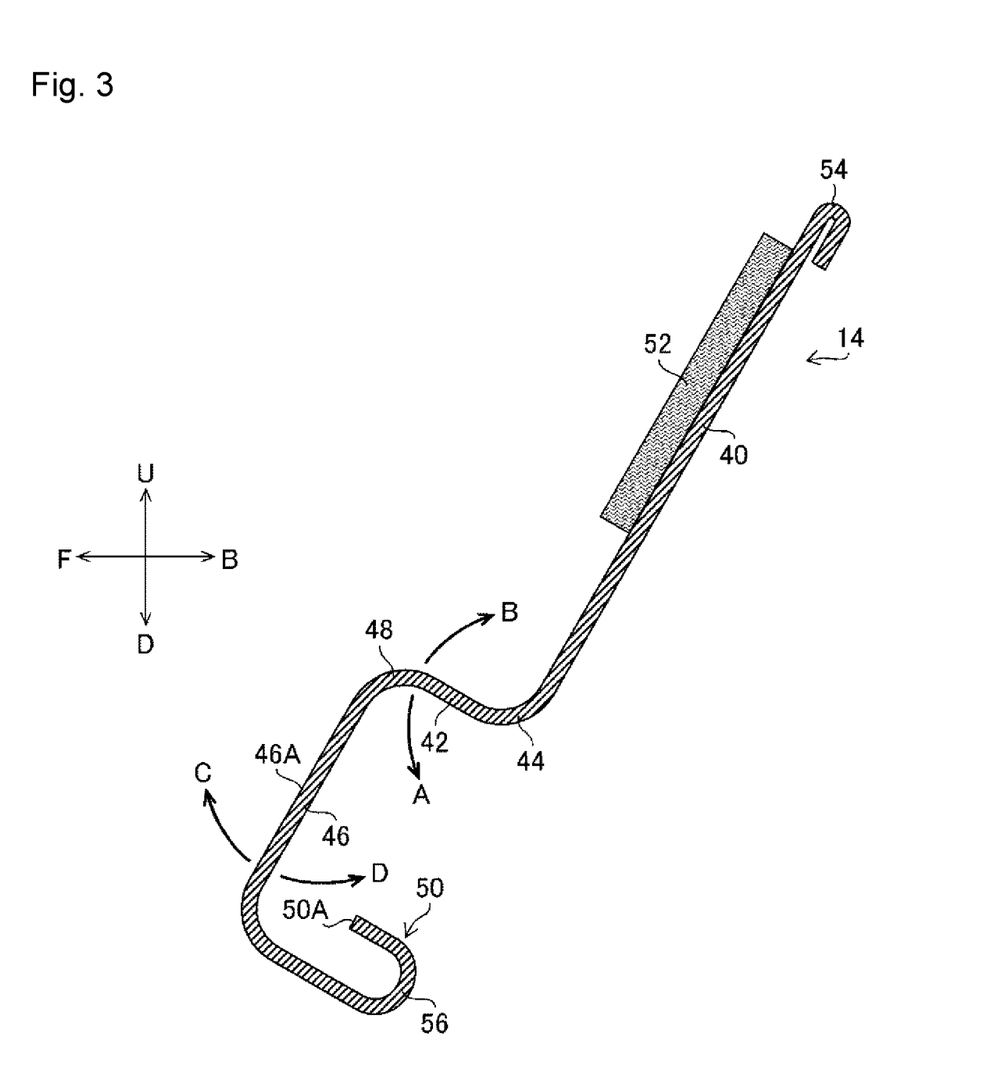
FIG. 3 is an enlarged cross-sectional view illustrating the clip according to the embodiment.

The clip 14 shown in FIG. 3 is disposed on the forward end portion of the windshield 12 as shown in FIG. 1. The clip 14 is a plate made of metal and has a thickness of at least 0.1 mm and at most 1.2 mm, though there is no limitation to the thickness.

The clip 14 according to this embodiment is formed of a metal plate, not a synthetic plastic molded product as in Patent Document 1. In this embodiment, stainless steel is exemplified as one example of the metal forming the clip 14. The metal is not limited to stainless steel. Any metal (for example, aluminum or iron) is applicable so long as such metal can undergo elastic deformation to absorb an error in shape or dimension of each of the windshield 12 as laminated glass, the clip 14 and the cowl louver 16. The clip 14 includes plural portions described below as its constituent elements. These constituent elements effectively increase the amount of elastic deformation and the direction to undergo elastic deformation.

The clip 14 includes a first plate portion 40, a second plate portion 42, a first bent portion 44, a third plate portion 46, a second bent portion 48 and an engaged portion 50 as shown in FIGS. 1 and 3.

The first plate portion 40 is bonded to an inner side surface 20A of the second glass plate 20 by a bonding member 52 as shown in FIG. 1. The first plate portion 40 has a backward end portion provided with a bent portion 54 in a folded-back shape, which is disposed so as to be folded back toward a forward end portion of the first plate portion 40. The bent portion 54 is so-called a hemming bend, and the bent portion 54 reinforces the first plate portion 40. And the bonding member 52, an acrylic resin-based, a urethane resin-based or an epoxy resin-based adhesive, or a known double-sided tape may be mentioned, for example. The bent portion 54 may have a forward end portion configured to be bent toward the outer side surface 18A, followed by being folded back toward the forward end portion of the first plate portion 40 so long as the forward end portion of the bent portion 54 is prevented from being brought into contact with the inner side surface 20A of the second glass plate 20 or interfering with the bonding member 52.

The second plate portion 42 is disposed so as to be located adjacent the forward end portion of the windshield 12 and be in substantially parallel to an end surface 12A of the forward end portion of the windshield 12. In other words, the second plate portion 42 is disposed so as to extend via the first bent portion 44 bent toward the outer side at a position adjacent the front end portion of the first plate portion 40. The first plate portion 40 and the second plate portion 42, which are thus configured, are connected together in an intersecting direction via the first bent portion 44.

The third plate portion 46 is disposed to extend forward with respect to the forward end portion of the windshield 12. The third plate portion 46 has an outer side surface 46A disposed on the inner side with respect to an extended surface of the outer side surface 18A of the first glass plate 18 (equivalent to the outer side surface 16A of the cowl louver 16). Further, the third plate portion 46 is bent in an L-shaped in section in the longitudinal direction of the vehicle. In other words, the third plate portion 46 is disposed so as to extend via the second bent portion 48 bent forward at a position adjacent an outer side end portion of the second plate portion 42. The second plate portion 42 and the third plate portion 46, which are thus configured, are connected in an intersecting direction via the second bent portion 48.

The engaged portion 50 is disposed on a forward end portion of the third plate portion 46. The engaged portion 50 is bent toward the inner side from a position adjacent the forward end portion of the third plate portion 46 and is further bent so as to have a leading edge directed toward the outer side. In other words, the engaged portion 50 includes a bent portion 56, which is formed in a U-shaped in section in the longitudinal direction of the vehicle. The shape of the engaged portion 50 in section is not limited to a U-shaped. The engaged portion may have any other shape in section.

In the connection structure 10 according to this embodiment, the end surface 12A of the forward end portion of the windshield 12 as laminated glass and the first protrusion portion 26 of the cowl louver 16 are disposed so as to be away from each other, and a spacer 58 is disposed in a gap between the end surface 12A and the first protrusion portion 26. The spacer 58 is made of a soft member, such as a resin or rubber, which is softer than the metal clip 14. Although it is shown in FIG. 1 that the spacer 58 is disposed on a portion of the first protrusion portion 26 confronting the end surface 12A, the spacer 58 may be disposed on a portion of an outer side surface of the first plate portion 40 between the end surface 12A and the first protrusion portion 26. When the spacer 58 is disposed on such a portion on the outer side surface of the first plate portion 40 between the end surface 12A and the first protrusion portion 26, the clip 14 and the spacer 58 may be formed as one unit.

Now, the connection procedure of the windshield 12 and the cowl louver 16 by use of the connection structure 10 thus configured will be described in reference to FIGS. 4 to 6.

Figure 4:
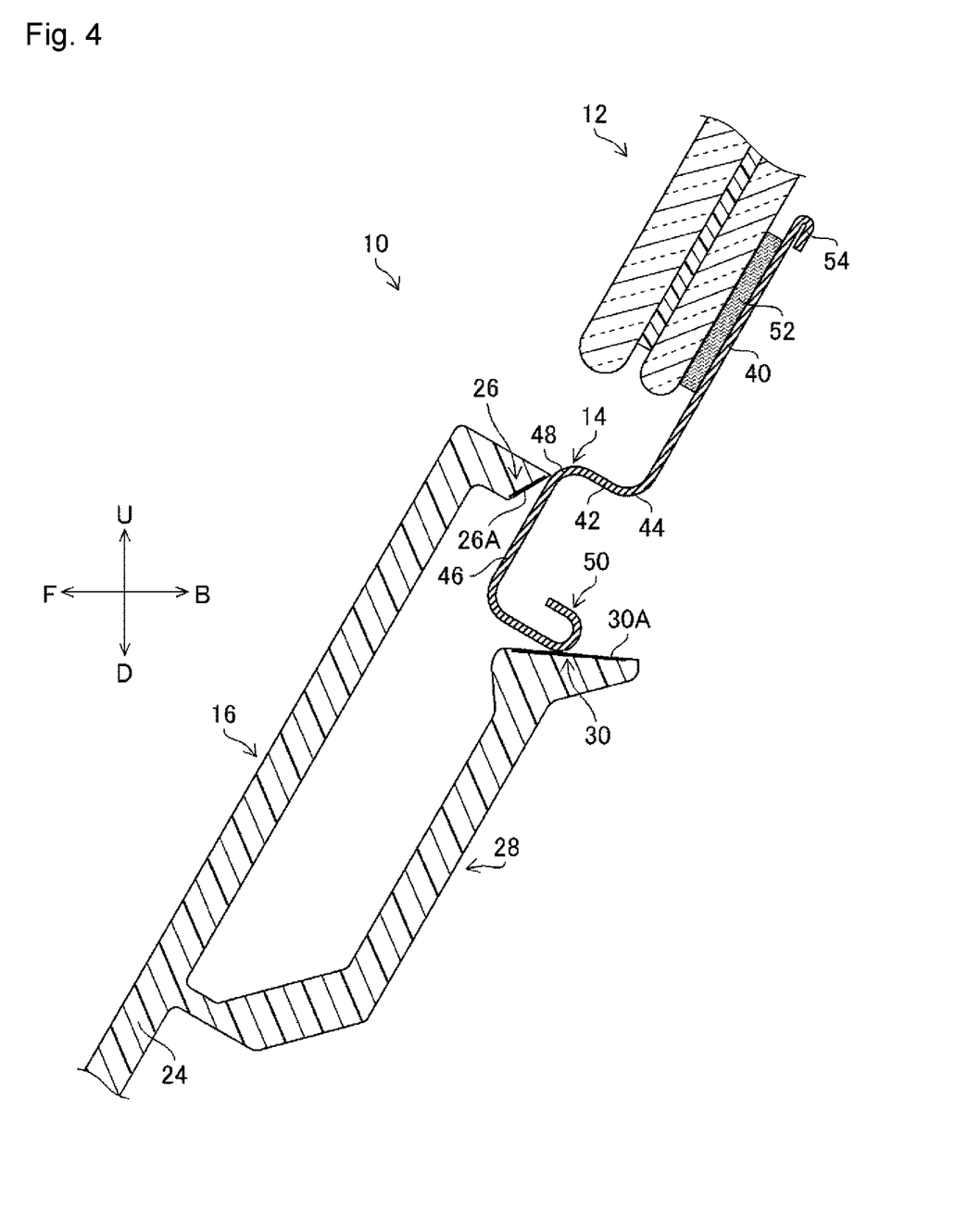
FIG. 4 is a schematic view illustrating a state wherein connecting operation starts to connect the cowl louver to a windshield.

In FIG. 4, the second bent portion 48 of the clip 14 is brought into contact with a leading edge of the first protrusion portion 26 of the cowl louver 16, and the engaged portion 50 of the clip 14 is brought into contact with the end surface 30A of the second protrusion portion 30 of the cowl louver 16.

Figure 5:
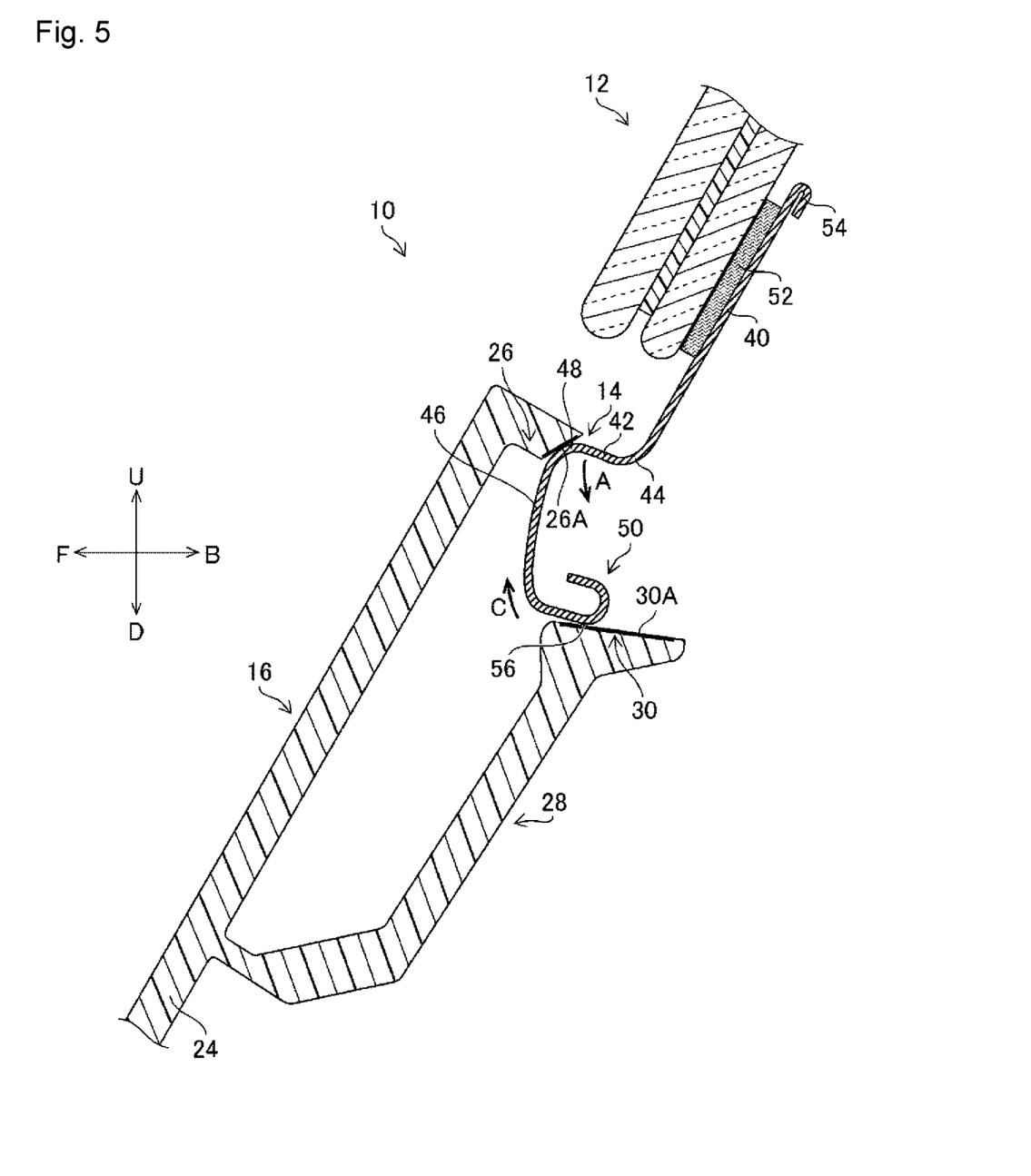
FIG. 5 is a schematic view illustrating a state just before the cowl louver has been connected to the windshield.

FIG. 5 is a view illustrating a state wherein the forward end portion of the windshield 12 and the backward end portion of the cowl louver 16 are relatively brought closer to each other from the state shown in FIG. 4.

In FIG. 5, the second bent portion 48 of the clip 14 is pressed against the end surface 26A of the first protrusion portion 26 of the cowl louver 16 to elastically deform the second plate portion 42 in a direction indicated by an arrow A, i.e., a forward direction, using the first bend portion 44 as a fulcrum. Further, the engaged portion 50 of the clip 14 is pressed against the end surface 30A of the second protrusion portion 30 of the cowl louver 16 to elastically deform the third plate portion 46 in a direction indicated by an arrow C, i.e., an outer side direction, using the second bent portion 48 as a fulcrum.

Figure 6:
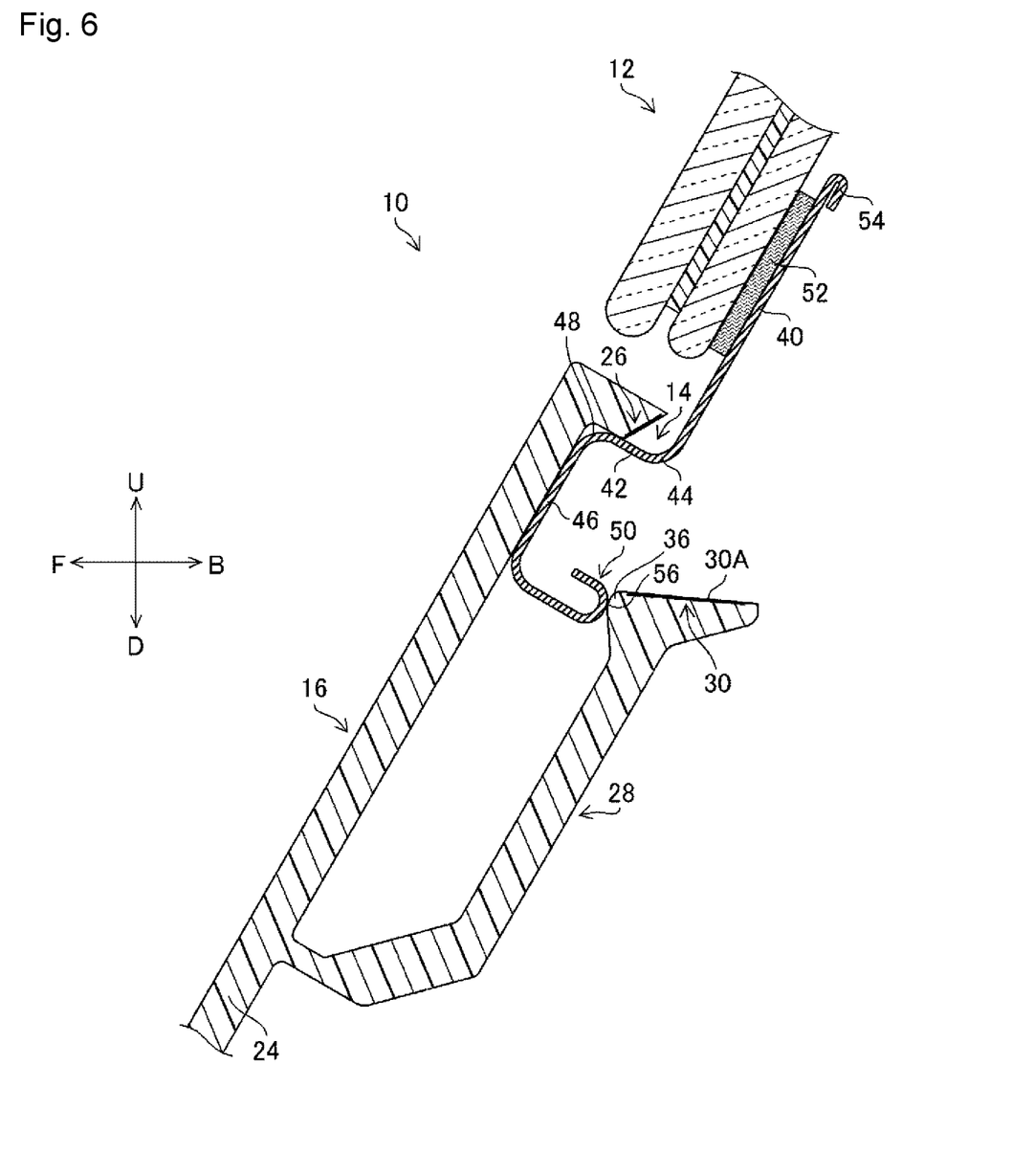
FIG. 6 is a schematic view illustrating a state just after the cowl louver has been connected to the windshield.

When the forward end portion of the windshield 12 and the backward end portion of the cowl louver 16 are relatively brought further closer to each other from the state shown in FIG. 5, the second bent portion 48 of the clip 14 moves to an engaged position shown in FIG. 6, sliding on the end surface 26A (first guide surface) of the first protrusion portion 26 of the cowl louver 16 as a guide surface. Further, the engaged portion 50 of the clip 14 moves to the engaged position shown in FIG. 6, sliding on the end surface 30A (second guide surface) of the second protrusion portion 30 of the cowl louver 16 as a guide surface.

Finally, the second bent portion 48 and the first protrusion portion 26 of the cowl louver 16 are at least partly brought into contact with each other, and the engaged portion 50 and the second protrusion portion 30 of the cowl louver 16 are at least partly brought into contact with each other, resulting in that the windshield 12 and the cowl louver 16 are connected together via the clip 14 as shown in FIG. 6. Thus, the connection operation of the windshield 12 and the cowl louver 16 comes to the end.

In the connection structure 10 according to this embodiment, the second bent portion 48 and the first protrusion portion 26 are resiliently engaged together via elastic deformation of the second plate portion 42 in a direction indicated by the arrow A (see FIG. 3), using the first bent portion 44 as a fulcrum. In other words, the second bent portion and the first protrusion portion 26 are resiliently engaged together by an elastic restoring force of the second plate portion 42 toward a direction indicated by an arrow B, i.e., a backward direction, which is caused by the elastic deformation of the second plate portion 42 in the direction indicated by the arrow A.

Further, in the connection structure 10 according to this embodiment, the engaged portion 50 and the second protrusion portion 30 are resiliently engaged together via elastic deformation of the third plate portion 46 in a direction indicated by an arrow C (see FIG. 3), using the second bent portion 48 as a fulcrum. In other words, the engaged portion 50 and the second protrusion portion 30 are resiliently engaged together by an elastic restoring force of the third plate portion 46 toward a direction indicated by an arrow D (see FIG. 3), i.e., the inner side direction, which is caused by the elastic deformation of the third plate portion 46 in the direction indicated by the arrow C.

Furthermore, when the engaged portion 50 and the second protrusion portion 30 are engaged together as already described, the engageable portion 28 of the cowl louver 16 is elastically deformed toward the inner side direction as a direction indicated by an arrow E (see FIG. 2) by an elastic deforming action of the constricted portion 33, using the bonded portion 32 as a fulcrum. The engaged portion 50 and the second protrusion portion 30 are resiliently engaged together by an elastic restoring force of the engageable portion 28 toward a direction indicated by an arrow F (see FIG. 2), which is caused by the elastic deformation of the engageable portion in the direction indicated by the arrow E (see FIG. 2). In other words, the engaged portion 50 and the second protrusion portion 30 are firmly engaged together by the elastic restoring forces in the direction indicated by the arrow D (see FIG. 3) and in the direction indicated by the arrow F (see FIG. 2).

As described above, in the connection structure 10 according to this embodiment, the cowl louver 16 includes the body portion 24, the first protrusion portion 26, the engageable portion 28 and the second protrusion portion 30, and the clip 14 includes the first plate portion 40, the second plate portion 42, the first bent portion 44, the third plate portion 46, the second bent portion 48 and the engaged portion 50. The second bent portion 48 and the first protrusion portion 26 are at least partly brought into contact with each other, and the engaged portion 50 and the second protrusion portion 30 are at least partly brought into contact with each other. Thus, the connection structure 10 according to this embodiment can effectively absorb an error in shape or dimension of each of the windshield 12, the clip 14 and the cowl louver 16.

More specifically, in the connection structure 10 according to this embodiment, the clip 14 is formed of a plate capable of increasing the amount of elastic deformation and includes the first bent portion 44 and the second bent portion 48 serving as a fulcrum of elastic deformation, resulting in that the clip 14 is elastically deformable in two directions and that the engagement (close contact) in a combination of the second bent portion 48 and the first protrusion portion 26 and a combination of the engaged portion 50 and the second protrusion portion 30 is established by using the elastic restoring forces caused by the elastic deformation. Thus, the connection structure 10 according to this embodiment can effectively absorb an error in shape or dimension of each of the windshield 12, the clip 14 and the cowl louver 16 as described above, resulting in reliable connection between the windshield 12 and the cowl louver 16.

The clip 14 preferably has a surface at least partly subjected to surface treatment. The surface treatment may be, for example, resin film treatment. The resin film applied to the clip 14 is preferably thinner than the thickness of the clip in section in the longitudinal direction of the vehicle. A portion of the clip 14 where the surface treatment is applied is preferably each of a portion of the second bent portion 48 in contact with the first protrusion portion 26 and a portion of the engaged portion 50 in contact with the second protrusion portion 30. The connecting operation of the window glass 12 and the cowl louver 16 can be smoothly performed because the application of the resin film treatment to such portions can reduce the frictional resistance between the second bent portion 48 and the first protrusion portion 26 and the friction resistance between the engaged portion 50 and the second protrusion portion 30. The resin film treatment may be applied to the end surface 26A of the first protrusion portion 26 and the end surface 30A of the second protrusion portion 30 as well. The surface treatment is not limited to the resin film treatment. Another surface treatment, such as rust-proofing treatment, may be applied.

Next, modifications of the clip 14 shown in FIG. 3 will be described.

Figure 7:
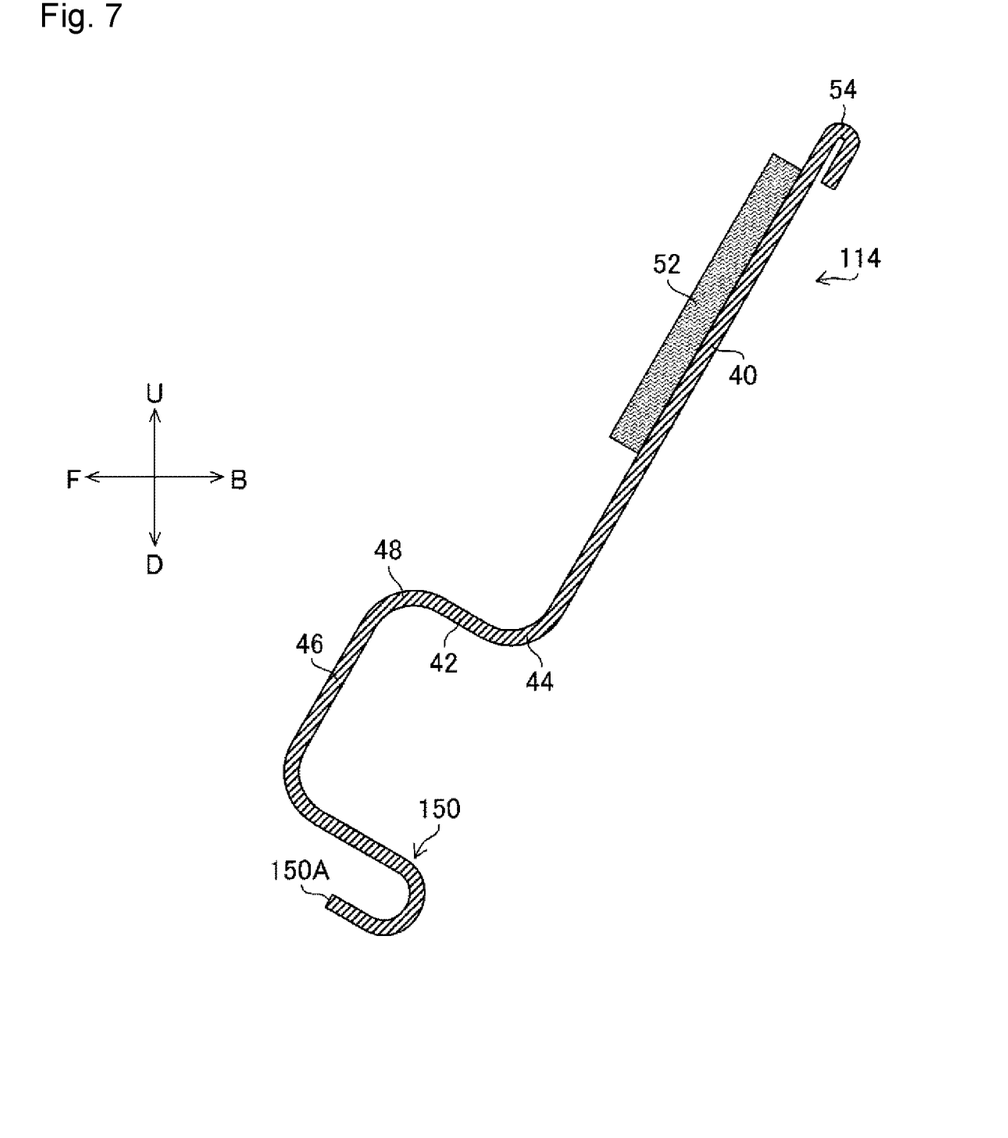
FIG. 7 is a cross-sectional view illustrating a first modification of the clip.

The difference of the clip 114 shown in FIG. 7 with reference to the clip 14 shown in FIG. 3 is the shape of an engaged portion 150. The engaged portion 50 of the clip 14 shown in FIG. 3 has a leading end 50A bent in a U-shaped toward a backward direction of the vehicle whereas the engaged portion 150 shown in FIG. 7 has a leading end 150A bent in a U-shaped toward a forward direction of the vehicle. This shape of the engaged portion 150 allows the clip 114 to be produced by press forming.

Figure 8:
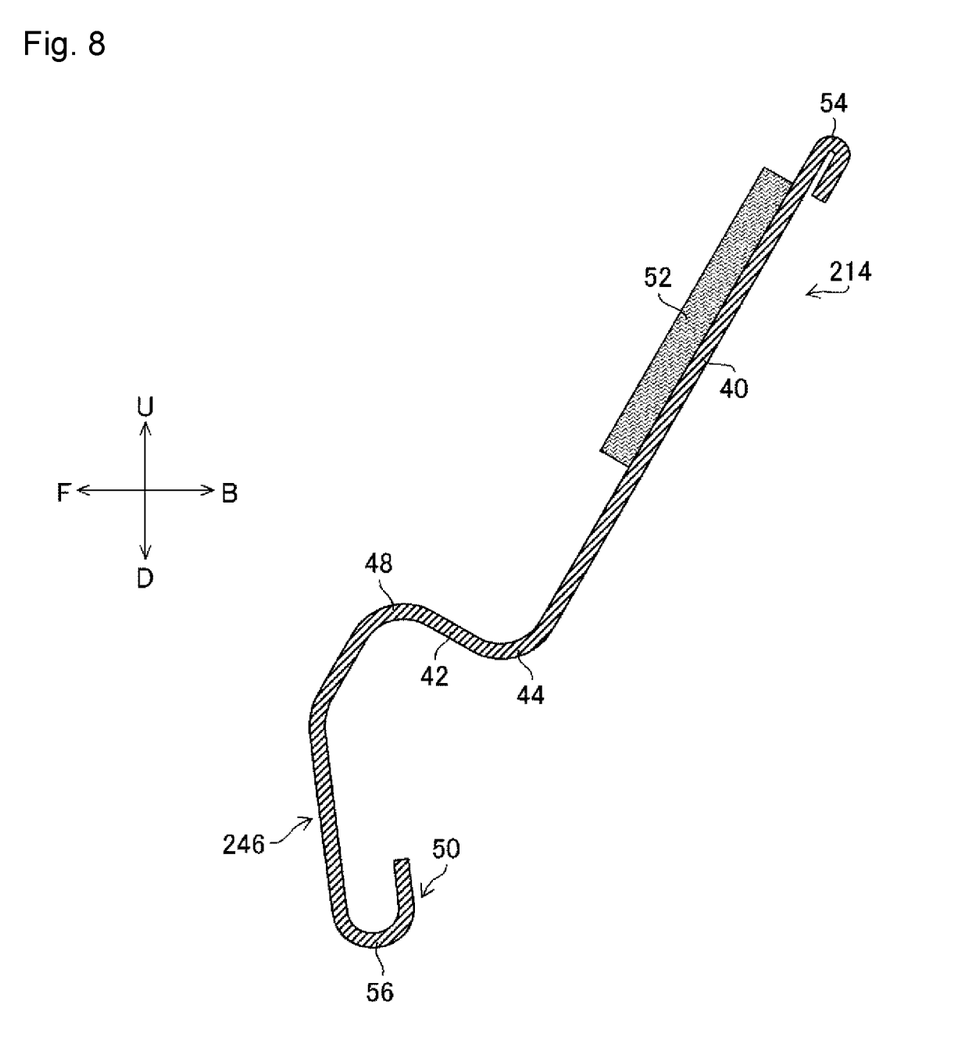
FIG. 8 is a cross-sectional view illustrating a second modification of the clip.

The difference of the clip 214 shown in FIG. 8 with reference to the clip 14 shown in FIG. 3 is the shape of a third plate portion 246. The third plate portion 46 of the clip 14 shown in FIG. 3 is bent in an L-shaped at an angle of substantially 90° whereas the third plate portion 246 shown in FIG. 6 is bent at an obtuse angle. In other words, the bent angle of the third plate portion 246 is not limited to 90° but may be an obtuse angle as shown in FIG. 8. The bent angle may be acute.

Figure 9A:
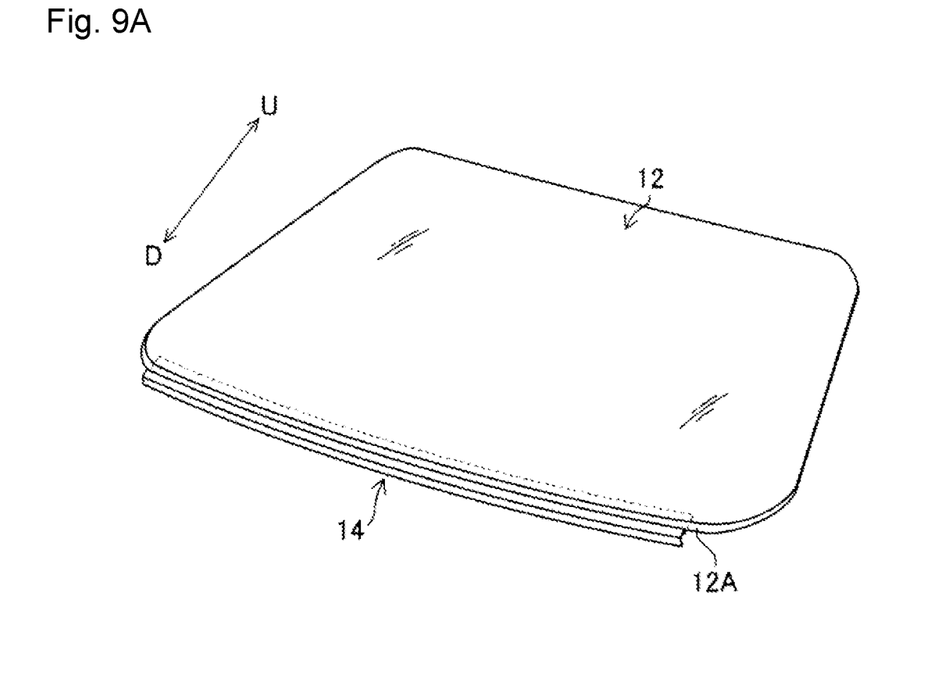
FIG. 9A is a schematic view illustrating a mode wherein the clip is configured as an elongated member.
Figure 9B:
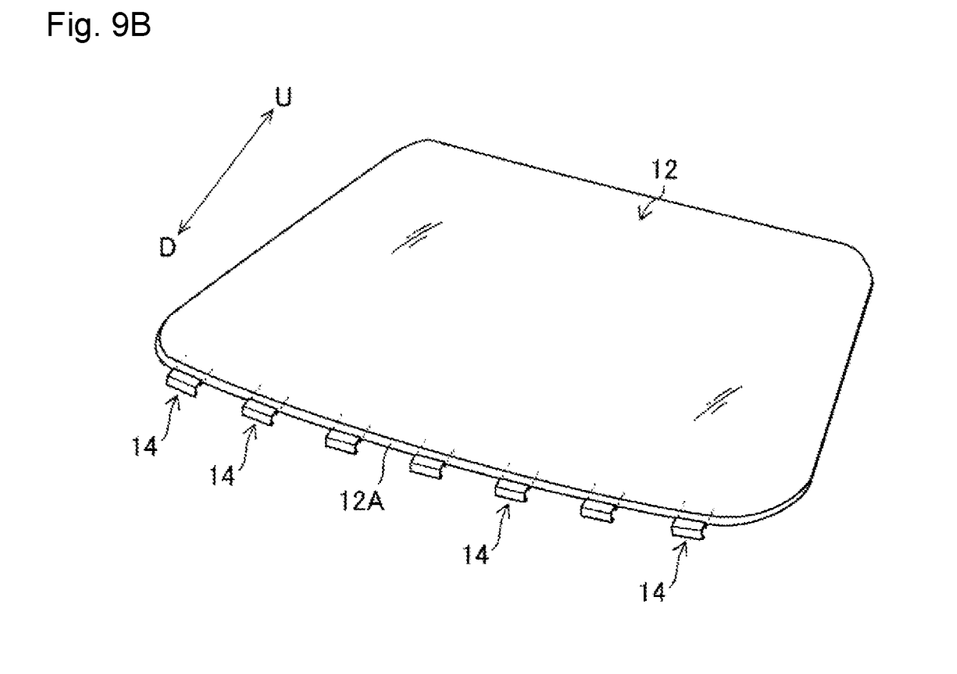
FIG. 9B is a schematic view illustrating a mode wherein the clip is configured as plural members having a short length.

FIG. 9A illustrates a mode wherein the clip 14 is configured as a single member elongated along the end surface 12A of the windshield 12. In contrast, FIG. 9B illustrates a mode wherein the clip 14 is configured as plural members having a short length and being spaced along the end surface 12A of the windshield 12. In FIGS. 9A and 9B, the cowl louver 16 (see FIG. 1) is not shown.

Either one of the clips 14 as an element of the present invention in FIGS. 9A and 9B is applicable, irrespective of whether the clip is configured as an elongated member shown in FIG. 9A or as plural members having a short length shown in FIG. 9B. The selection of the mode shown in FIG. 9A and the mode shown in FIG. 9B may be made, taking the shape of the cowl louver 16 or another factor into consideration.

Figure 10:
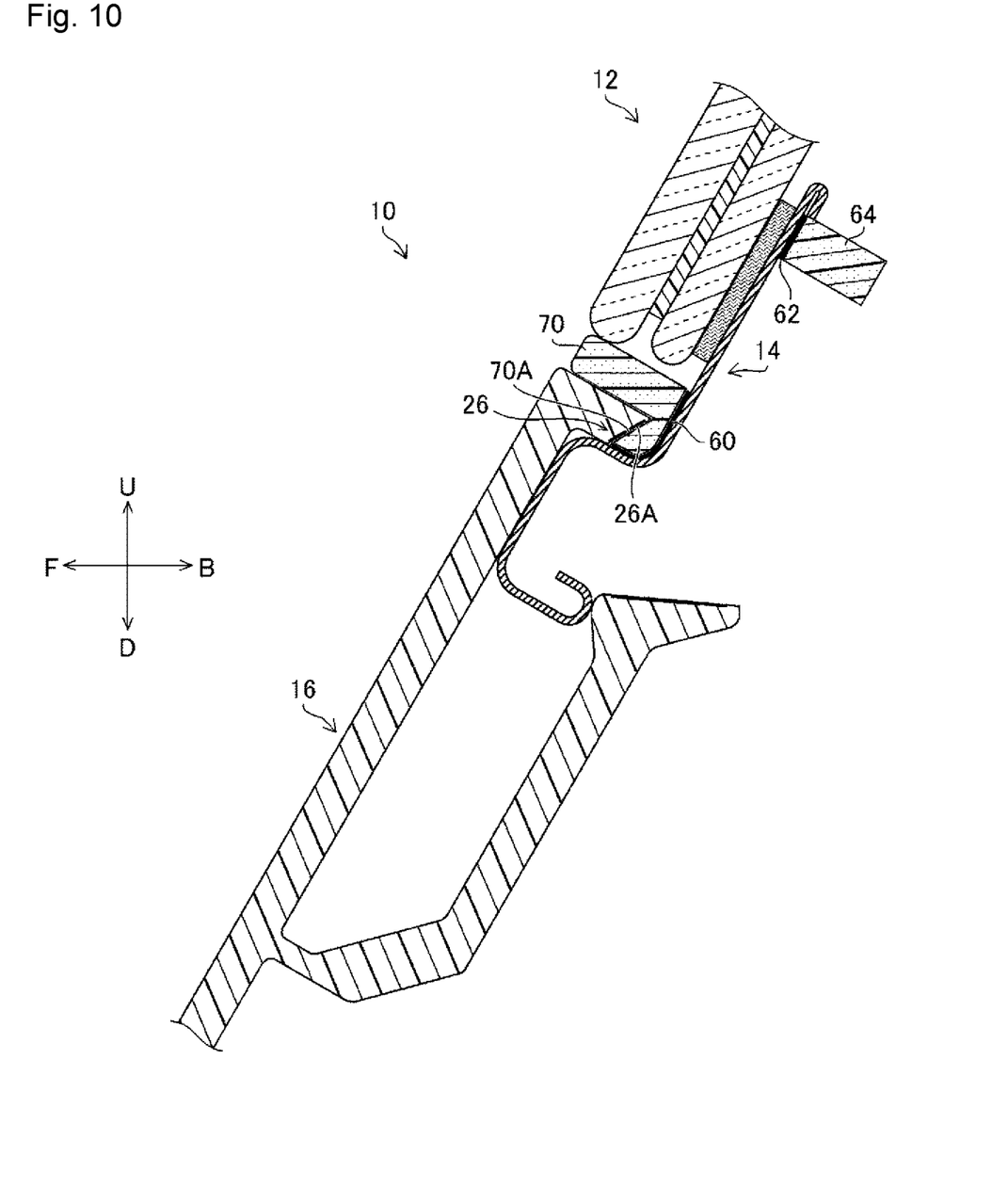
FIG. 10 is a schematic view illustrating another mode of spacer.
Figure 11:
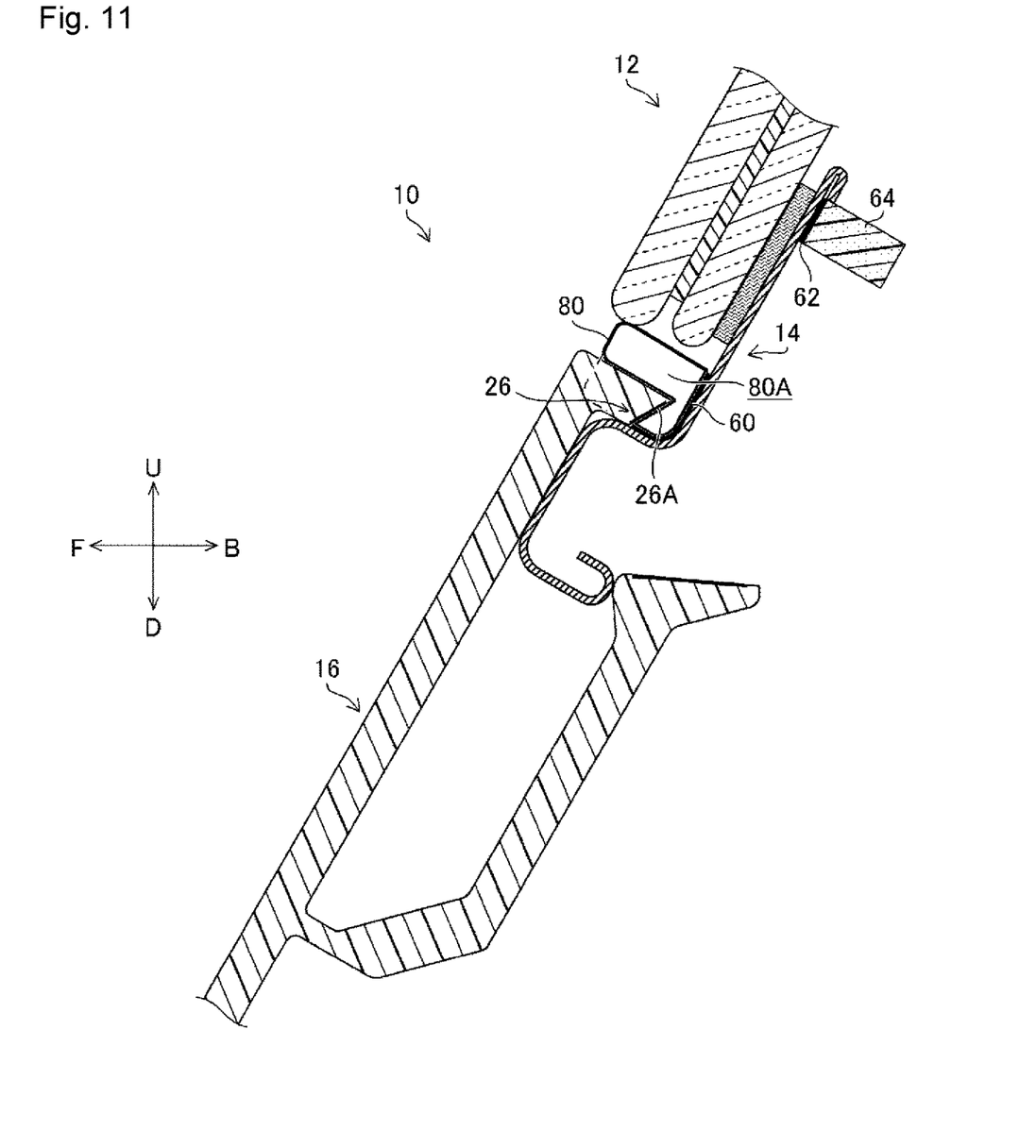
FIG. 11 is a schematic view illustrating another mode of spacer.
Figure 12:
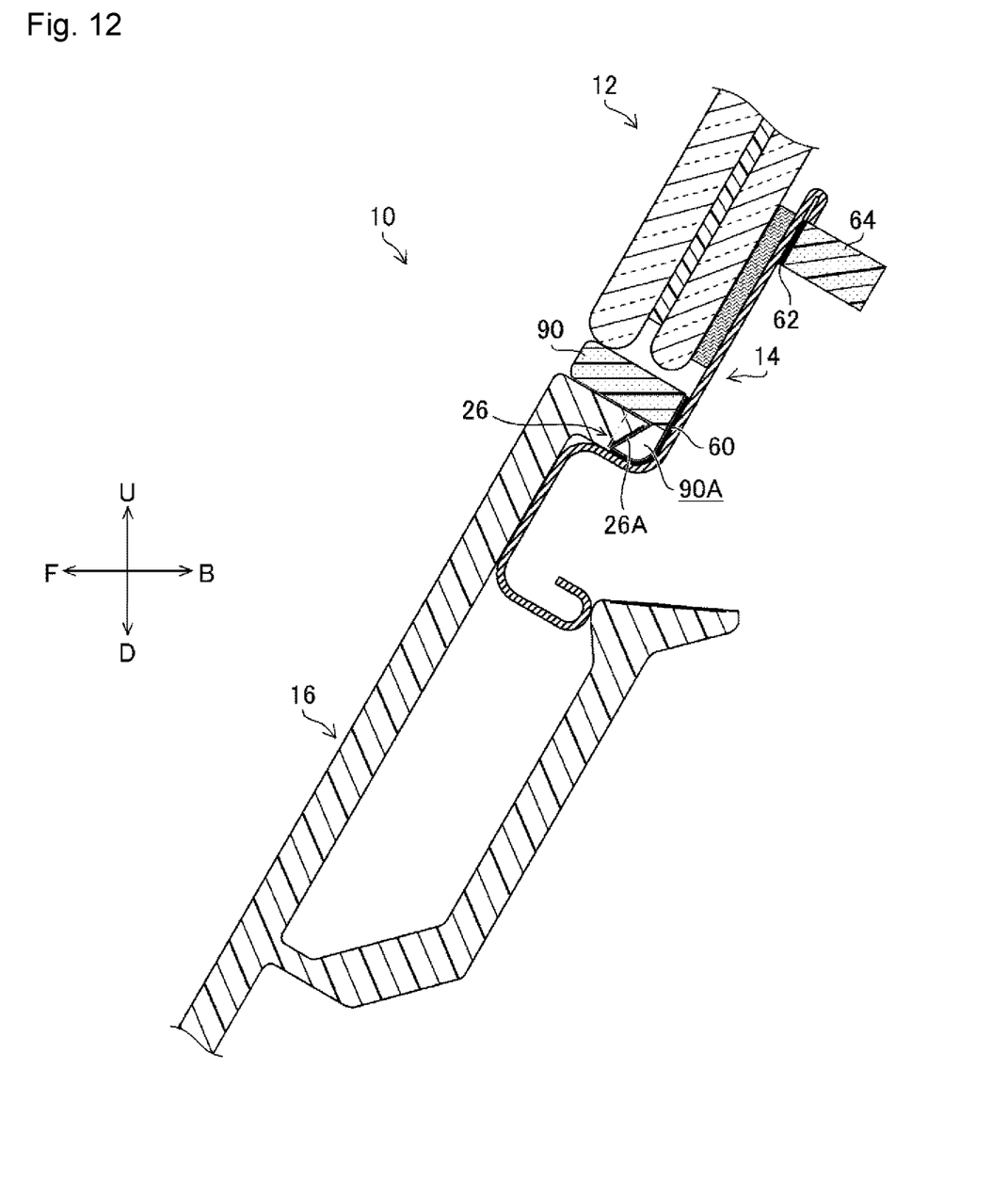
FIG. 12 is a schematic view illustrating another mode of spacer.

FIGS. 10 to 12 illustrate examples of how to form the spacer 58 or another member with reference to the clip 14.

In the forming methods shown in FIGS. 10 to 12, after the clip 14 made of stainless steel is extruded by roll-forming, primer coats 60 and 62 as an adhesive are applied to certain positions of the clip 14 in a subsequent step in the same extruding line. The position where the primer coat 60 is applied is a position corresponding to a position where a spacer 70, 80 or 90 is disposed whereas the position where the primer coat 62 is applied is a position corresponding to a position where a seal member 64 having a barrier function is disposed. After application, molding extrusion equipment installed in the same extrusion line is used to extrude a soft member made of a polyolefin soft resin or polyvinyl chloride so as to form the spacer 70, 80 or 90 at the position to apply the primer coat 60 and to form the seal member 64 on the position to apply the primer coat 62.

The spacer 70 shown in FIG. 10 has a tapered end surface 70A brought into contact with the end surface 26A of the first protrusion portion 26 so as to have an improved watertight effect. The spacer 80 shown in FIG. 11 is formed in a cylindrical shape having a hollow space 80A as shown in a two-dot chain line and is disposed the gap between the end surface 12A and the first protrusion portion 26, being elastically deformed as shown in a solid line, to have an improved watertight effect. The spacer 90 shown in FIG. 12 has a hollow space 90A shown in a two-dot chain line at a portion in contact with the end surface 26A of the first protrusion portion 26 and is brought into contact with the end surface 26A, being elastically deformed as shown in a solid line, to increase watertight effect.

EXPLANATION OF REFERENCE SYMBOLS

10: connection structure, 12: windshield, 14: clip, 16: cowl louver, 18: first glass plate, 20: second glass plate, 22: interlayer, 24: body portion, 26: first protrusion portion, 28: engaged portion, 30: second protrusion portion, 32: engageable portion, 33: constricted portion, 34: gap, 36: first convex portion, 38: second convex portion, 40: first plate portion, 42: second plate portion, 44: first bent portion, 46: third plate portion, 48: second bent portion, 50: engaged portion, 52: bonding member, 54: bent portion, 56: bent portion, 58: spacer, 60 and 62: primer coat, 64: seal member, 70: spacer, 80: spacer, 90: spacer, 114: clip, 150: engaged portion, 214: clip, 246: third plate portion

What is claimed is:

1. A connection structure between a windshield and a cowl louver, comprising:
    laminated glass including a first glass plate disposed on an outer side of a vehicle, a second glass plate disposed on an inner side of the vehicle and an interlayer bonding the first glass and the second glass;
    a clip disposed on a forward end portion of the laminated glass; and
    a cowl louver including a body portion, a first protrusion portion disposed on a backward end portion of the body portion, an engageable portion disposed on an inner side surface of the body portion via a joint portion so as to extend toward the backward end portion of the body portion, and a second protrusion portion disposed on a backward end portion of the engageable portion;
    wherein the clip comprises a plate including:
    a first plate portion to be bonded to an inner side surface of the second glass plate,
    a second plate portion to be disposed adjacent a forward end portion of the laminated glass so as to extend along an end surface of the forward end portion of the laminated glass,
    a first bent portion connecting between the first plate portion and the second plate portion,
    a third plate portion extending in a front direction with respect to the forward end portion of the laminated glass,
    a second bent portion connecting between the second plate portion and the third plate portion, and
    an engaged portion disposed on a leading end portion of the third plate portion; and
    wherein the second bent portion and the first protrusion portion are at least partly brought into contact with each other, and
    the engaged portion and the second protrusion portion are at least partly brought into contact with each other.

2. The connection structure according to claim 1, wherein the second bent portion and the first protrusion portion are resiliently engaged together by elastic deformation of the second plate portion, using the first bent portion as a fulcrum, and
    the engaged portion and the second protrusion portion are resiliently engaged together by elastic deformation of the third plate portion, using the second bent portion as a fulcrum.

3. The connection structure according to claim 1, wherein the third plate portion has an outer side surface flush with an extended surface of an outer side surface of the first glass plate.

4. The connection structure according to claim 1, wherein the engage portion is formed in a U-shaped in section in a longitudinal direction of the vehicle.

5. The connection structure according to claim 1, wherein the third plate portion is formed in an L-shaped in section in a longitudinal direction of the vehicle.

6. The connection structure according to claim 1, wherein the end surface of the forward end portion of the laminated glass is disposed so as to be away from the first protrusion portion, and the end surface and the first protrusion portion form a gap therebetween, a softer member than the clip being disposed as a spacer in the gap.

7. The connection structure according to claim 1, wherein the first plate portion has a backward end portion formed in a folded-back shape so as to be folded back toward a forward end portion of the first plate portion.

8. The connection structure according to claim 1, wherein the clip is made of metal.

9. The connection structure according to claim 1, wherein the clip has a surface at least partly subjected to surface treatment.

10. The connection structure according to claim 9, wherein the surface treatment comprises resin film treatment; and
    the resin film has a smaller thickness than the clip in section in the longitudinal direction of the vehicle.

11. The connection structure according to claim 9, wherein a portion of the clip where the surface treatment is applied comprises a portion of the second bent portion in contact with the first protrusion portion and a portion of the engaged portion in contact with the second protrusion portion.

12. The connection structure according to claim 1, wherein the first protrusion portion has a first guide surface sliding on the second bent portion so as to guide the first protrusion toward an engagement position with the second bent portion, and
    the second protrusion portion has a second guide surface sliding on the engaged portion so as to guide the second protrusion toward an engagement position with the engaged portion.

13. The connection structure according to claim 1, wherein the bonded portion has a constricted portion permitting the engageable portion to be elastically deformed toward an inner side direction of the vehicle, using the bonded portion as a fulcrum.

14. The connection structure according to claim 1, wherein the cowl louver has an outer side surface flush with an extended surface of an outer side surface of the first glass plate.

15. The connection structure according to claim 1, wherein the clip has a thickness of at most 1.2 mm.

* * * * *